June 12, 1962 R. M. WILMOTTE 3,039,013
ELECTROLUMINESCENT ELECTRICAL METER
Original Filed Sept. 4, 1956 2 Sheets-Sheet 1

Raymond M. Wilmotte
INVENTOR.

BY Paris and Haskell

June 12, 1962 R. M. WILMOTTE 3,039,013
ELECTROLUMINESCENT ELECTRICAL METER
Original Filed Sept. 4, 1956 2 Sheets-Sheet 2

Raymond M. Wilmotte
INVENTOR.

BY Paris and Haskell

United States Patent Office 3,039,013
Patented June 12, 1962

3,039,013
ELECTROLUMINESCENT ELECTRICAL METER
Raymond M. Wilmotte, New York, N.Y.
(68 Mountain Ave., Princeton, N.J.)
Continuation of abandoned application Ser. No. 607,769, Sept. 4, 1956. This application Feb. 5, 1959, Ser. No. 795,309
13 Claims. (Cl. 313—108)

The present invention relates to electrical meters, and more particularly to electroluminescent electrical meters, and is a continuation of my copending application S.N. 607,769, filed September 4, 1956, now abandoned.

The phenomenon of electroluminescence is well known, and the term is used herein to denote the production of visible light by the luminescence of certain phosphors when exposed to a fluctuating electrical field. To effect this electroluminescence, it is the usual practice to disperse and imbed an appropriate phosphor material in a dielectric medium, and sandwich this phosphor-dielectric between a pair of conducting plates, thus forming a device much akin to a capacitor. Electrical leads may then be attached to the plates, and when a fluctuating electrical field of suitable magnitude and frequency is applied thereto, the phosphor luminesces. The degree of phosphor luminescence is, within limits determined by the phosphor, a function both of signal frequency and voltage magnitude, and for a given electroluminescent capacitor there are essential thresholds of frequency and voltage below which visible luminescence will not occur. In order to render the phosphor luminescence visible over a large or substantial area, it is the usual practice to utilize a light transmissive dielectric medium and a transparent conductor plate for one of the capacitor plates above referred to.

Examples of electroluminescent devices of the type here indicated, or electroluminescent capacitors or cells as they may be called, are found in the following U.S. patents:

E. L. Mager, 2,566,349
E. L. Mager, 2,624,857
W. W. Piper, 2,698,915
L. R. Koller, 2,709,765
W. W. Piper et al., 2,721,950
W. C. Gungle et al., 2,728,870
J. L. Gillson, Jr., 2,733,367

As more specifically taught in the foregoing patents, the phosphor may be zinc sulfide and/or zinc oxide, or may be from the zinc and cadmium sulfoselenide group, or may be zinc fluoride or cadmium sulfide, properly activated with small amounts of copper, lead, halogen, manganese, thallium, cerium, and/or silver. Suitable dielectric media into which the activated phosphors may be dispersed or imbedded are various light transmissive and dielectric resins, lacquers, plastics, waxes, and the like. The aforementioned transparent conductor plate may for example be a glass plate upon which is deposited a microfilm of conducting metal.

By the present invention, electroluminescent capacitors as above indicated, and as more specifically described in the above patents, are utilized in combination with appropriate circuitry to provide electrical meters, and by their luminescent response to applied signals to render a direct reading of the value of the signal applied thereto. As stated previously, the luminance of an electroluminescent capacitor is a function of the voltage of the signal applied thereacross, and of the frequency of that signal. Also, there is a voltage-frequency threshold value essential for sustained luminescence of a given capacitor. The present invention utilizes these characteristics to arrive at a reading of the voltage or frequency of an applied signal.

It is accordingly one object of the present invention to provide electroluminescent electrical meters.

It is another object of the present invention to provide an electrical meter having an indicator luminescently responsive to a characteristic or characteristics of an electrical signal applied thereto.

A still further object of the present invention is to provide an electrical meter as above indicated whose luminescent response is a function of the voltage and/or frequency of the signal applied thereto.

Other objects and advantages of the present invention will become apparent to those skilled in the art from a consideration of the following detailed description of exemplary embodiments of the present invention, had in conjunction with the accompanying drawings, wherein.

Figure 1:
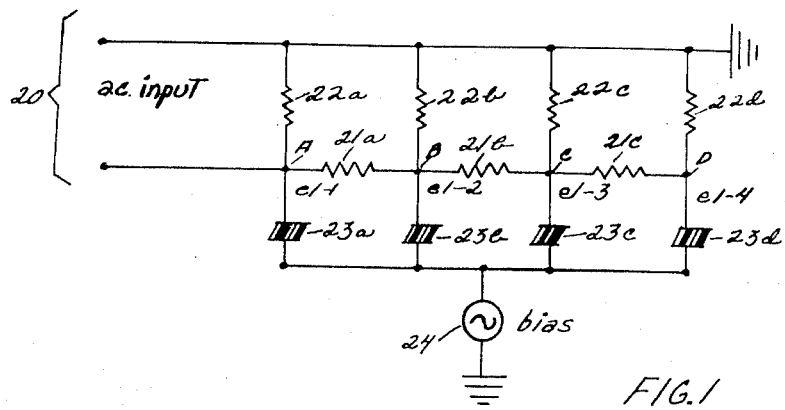
FIG. 1 is a schematic circuit diagram of one embodiment of the present invention.

One basic embodiment of an electroluminescent electrical meter embodying the principles of the present invention is shown in FIG. 1, as a non-continuous incremental, or step-type meter. This meter includes an attenuator resistance network comprising resistors 21a, b, and c and resistors 22a, b, c, and d. By this network, the application of a voltage across the network input 20 results in diminishing fractions thereof at points A, B, C, and D, as is readily apparent. Electroluminescent capacitors 23a, b, c, and d are coupled respectively to the points A, B, C, and D, and are connected in parallel to ground.

Considering the functioning of this circuit as a voltmeter, when an A.C. voltage is applied across input 20, diminishing A.C. voltage values appear at points A, B, C, and D in accordance with the values of the several resistors 21 and 22. As previously stated, one characteristic of an electroluminescent capacitor or cell is that it does not luminesce unless the A.C. voltage thereacross exceeds a certain threshold determined by the characteristics of the particular capacitor and the frequency of applied signal. Therefore, the capacitors 23 luminesce up to the point along the attenuator network where the voltage drops below the threshold value. By empirical calibration of the meter, or by calculation from resistor values and a predetermined voltage threshold value of the electroluminescent capacitors, the value of a voltage applied at the input may be read from the sequence of luminous capacitors, particularly from the last capacitor in the series to luminesce. In a practical physical embodiment of this voltmeter, particularly when a transparent conductive plate is utilized as an electrode for each of the capacitors, a number or other calibration may be imprinted on or associated with those plates, denoting the value of the voltage applied to the meter. Also, although the capacitors 23 are shown as four separate elements in the circuit, it is apparent that the electroluminescent capacitor array may be formed as a unit employing but one phosphor-dielectric plate, with the several capacitor electrode pairs spaced thereupon in any desired and appropriate arrangement, so long as they are sufficiently spaced to avoid cross coupling or cross illumination therebetween.

It is also contemplated by the present invention to provide an A.C. bias voltage source in the parallel capacitor circuit, as indicated at 24. The bias source may be chosen in value to bring all the capacitors to within any desired voltage difference from their luminescent threshold. Thus, by appropriately correlating the bias voltage with the attenuator resistor values, the voltmeter may be designed to operate in response to various orders of magnitude of input voltage. Further, the bias voltage source may be made adjustable so the voltmeter can respond to various ranges of voltage. For example, with a given resistor network: when it is desired to measure a voltage of relatively large magnitude, the bias voltage may be set to a low value so that at some point along the capacitor array the combination of measured and bias voltages do not exceed the capacitor threshold voltage; and inversely, when it is desired to measure a voltage of relatively small magnitude, the bias voltage may be set to a high value, close to the capacitor threshold, so that some of the capacitors along the array are caused to luminesce. For any given value of input signal at 20, for the potential along resistors 21a, b and c to be at the threshold value for the electroluminescent material at a point between A and D, this is a function of the relationship of the impedance of the voltage attenuator network to the impedance across the cells 23a, b, c, and d. To this end, the bias voltage source 24 functions to relate to each other the effective values of the electrical series impedance along the attenuator network, to the shunt impedance across the cells, to the input signal voltage, so that the cell threshold voltage will be obtained between the ends of the attenuator network.

With regard to the biasing of the capacitors 23, it is contemplated that the most desirable effect would be to afford an equal bias from source 24 to all the capacitors. This may be done by choosing the resistors 22 all of the same value, and of course providing the same reactance for each of the condensers 23. However, unequal bias relationships for the capacitors may be provided if desired.

In order to obtain a significant or meaningful scale of voltage reading along the length of the voltmeter illustrated in FIG. 1, the series impedance to the input signal, i.e. the impedance along the attenuator network, must have a substantial value relative to the shunt impedance to the input signal, i.e. the impedance across the cells 23. And preferably, the relationship of these impedances should be such that the voltage across the cell 23a to the voltage across the cell 23d should be substantially greater than 1, so that over the operating range for which the voltmeter is designed, the threshold voltage for the electroluminescent material will appear between the ends of the attenuator network. If the series impedance of the unit is inconsequential compared to the shunt impedance, it is apparent that it would be impossible to obtain any meaningful voltage scale, because a very slight change in input voltage would constitute a complete transition from the voltage across all cells being below threshold and the voltage across all cells being above threshold.

Figure 2:
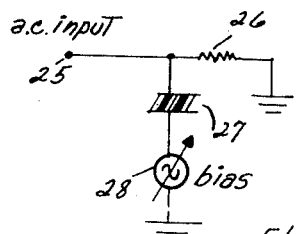
FIG. 2 is a schematic circuit diagram of a second embodiment of the present invention.

A variation of the foregoing meter is shown in FIG. 2. In this embodiment the A.C. voltage to be measured is applied to the input 25 and across the resistor 26. A single electroluminescent capacitor 27 is connected in parallel with the resistor, and a variable A.C. voltage bias source is connected in series with the capacitor. This arrangement is designed to read any input voltage less than the capacitor threshold voltage for the particular input signal frequency. When such an input voltage is applied and the bias voltage is set at zero, the capacitor does not luminesce. However, as the A.C. bias voltage is increased, a point is reached where the capacitor does luminesce. Since the threshold voltage and the amount of bias voltage may be known, the input voltage can be readily calculated therefrom. Or the bias voltage source may be calibrated to read directly in terms of the input voltage.

In each of the foregoing embodiments, since the luminescence of the capacitors is a function of both voltage and frequency, it is assumed that the frequency of the input signal is maintained substantially constant, and it is apparent that any calibrations of the instruments as voltmeters is established for a particular input frequency.

In view of this frequency characteristic of electroluminescent capacitors, the meters of FIG. 1 and FIG. 2 may be utilized for measuring frequency. In this connection it should be understood that the higher the frequency of applied signal, the lower the voltage at which the luminance from an electroluminescent condenser becomes clearly visible. This phenomenon occurs particularly at lower frequencies. Therefore, with reference to FIG. 1 as a frequency meter, if the A.C. input voltage is established, as by a limiter, to an appropriate fixed value, variations in input frequency are determined by variations in the number of capacitors caused to luminesce. For example: the higher the input frequency, the lower the voltage necessary to obtain clear luminance from a capacitor; and since the fixed input voltage drops along the attenuator network, the point at which the capacitors stop luminescing or is no longer clearly visible is farther down the line for a higher input frequency than would be the case where a lower input frequency is used. For frequency measuring purposes, the A.C. bias voltage source 24 may be used in the same manner as in the instance of voltage measurement, to establish different ranges of meter response.

In the instance of FIG. 2 as a frequency meter, it is therefore apparent that for a known fixed input voltage, the higher the input frequency, the lower the bias voltage necessary to obtain luminescence of capacitor 27. Accordingly, the variable bias voltage source 28 may be calibrated in terms of input frequency.

Figure 3:
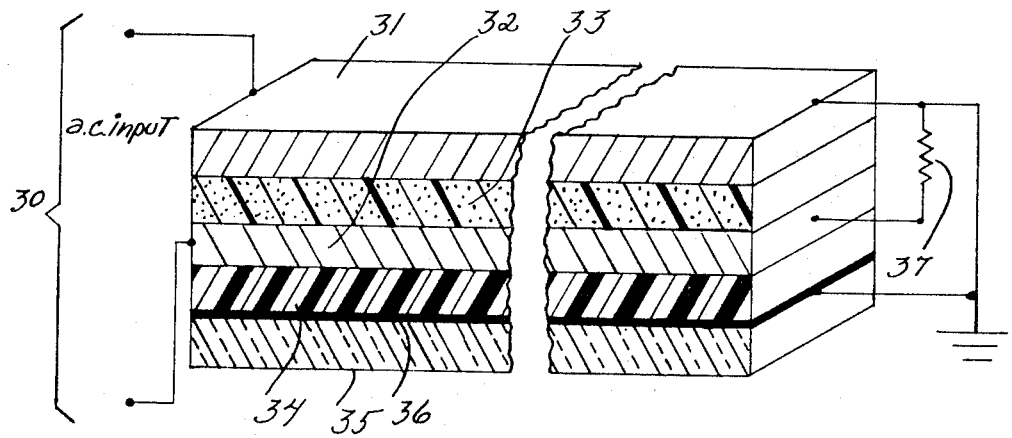
FIG. 3 is a partially physical and partially electrical schematic representation of a third embodiment of the present invention, with the physical portion in perspective and cross-section.

The previously described embodiment of FIG. 1 is a step-by-step or fixed increment type of meter. In FIG. 3 there is shown a continuous scale or analogue form of the meter, which corresponds electrically in most respects to the increment type embodiment of FIG. 1. This form of the invention may comprise a series of plates, preferably elongate in form, chosen from materials adapted to provide a suitable attenuating transmission line. The top plate 31 is shown as the ground plate. This plate is capacitively coupled to high resistance plate 32, with a dielectric 33 interposed therebetween. Dielectric 33 is preferably a lossy dielectric. The transmission line made up of plates 31 and 32 and the dielectric 33 therebetween is terminated in its characteristic impedance 37, and forms one electrode or condenser plate for a continuous elongate electroluminescent capacitor. Layer 34 is the electroluminescent phosphor-dielectric, and is sandwiched between the line 31, 32, 33, as one condenser plate, and transparent conductive plate 35, to form the electroluminescent condenser or cell. Transparent plate 35 may be glass carrying a transparent microfilm of conductive metal 36 over one side.

The operation of the instant embodiment as a voltmeter or frequency meter is the same as described above in connection with FIG. 1. The signal whose voltage or frequency is to be measured is applied across the input terminals 30, which may be connected across the transmission line to plates 31 and 32. A portion of the phosphor 34 then luminesces along the length of the unit up to a point where the voltage value of the input signal diminishes below the luminescence threshold value, for the input frequency used. The length of luminescence can be observed through the transparent conductor plate 35, 36, and suitable calibrations can be associated with this transparent plate to read the value of the input signal from the extent of luminescence along the length of the instrument. A bias source, not shown, may be included between the conductor 36 and ground. The relationship between the series impedance, i.e. attenuator line 31, 32, 33, and the shunt impedance, i.e. across dielectric 34, and the function of the bias source above-mentioned, are the same as expressed previously with relation to the description of the FIG. 1 embodiment.

As in the preceding embodiments, this meter can be used as a voltmeter, when the calibrations are established in terms of voltage for a given frequency of input signal; and this meter can likewise be used as a frequency meter, by establishing a fixed voltage input and providing a calibration therefor in terms of frequency.

Figures 4, 5:
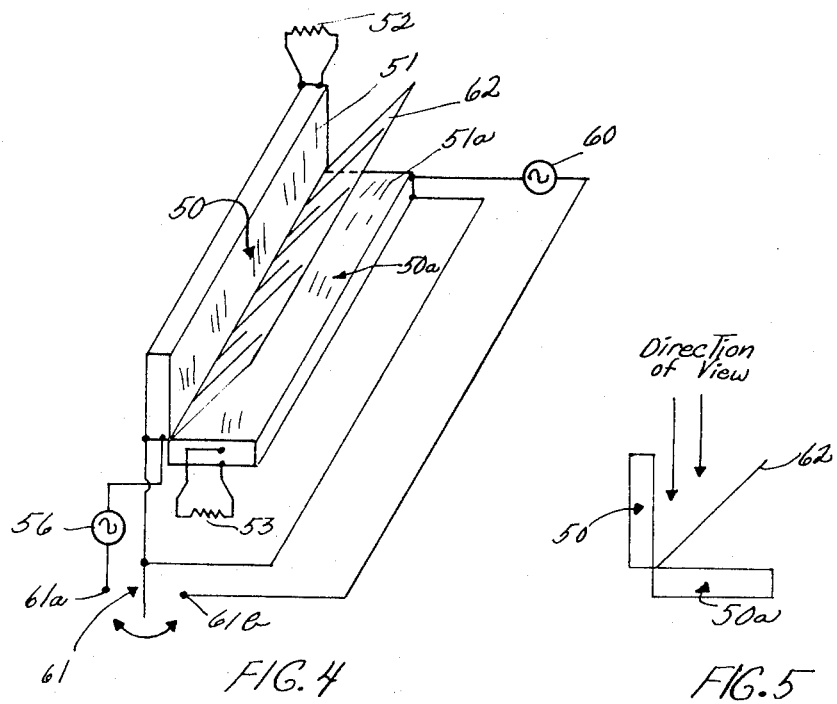
FIG. 4 is a partially physical and partially electrical schematic representation of a refinement of the embodiment shown in FIG. 3.
FIG. 5 is an end view of the representation had in FIG. 4.

A refinement of the continuous scale or analogue form of the invention is shown in FIGS. 4 and 5, and is based upon the principles utilized in the embodiment of FIG. 3. The instant form of the meter employs two transmission line electroluminescent type units 50 and 50a, which may each be of the construction shown in FIG. 3, one for detecting the desired information of an unknown signal to be measured, and the other for providing a reference standard. The two units 50 and 50a may be substantially identical, except that their ends are oppositely oriented. These units include the transparent conductor plates 51 on unit 50 and 51a on unit 50a, and are terminated in their characteristic impedances 52 and 53. In the case of line 50, when switch 61 is closed to contact 61a, the voltage from source 56 is applied thereto; and in the case of line 50a, when switch 61 is closed to contact 61b, the voltage from source 60 is applied thereto. Voltage source 56 may for example be the unknown signal to be measured, while source 60 may be the known standard.

Figure 6:
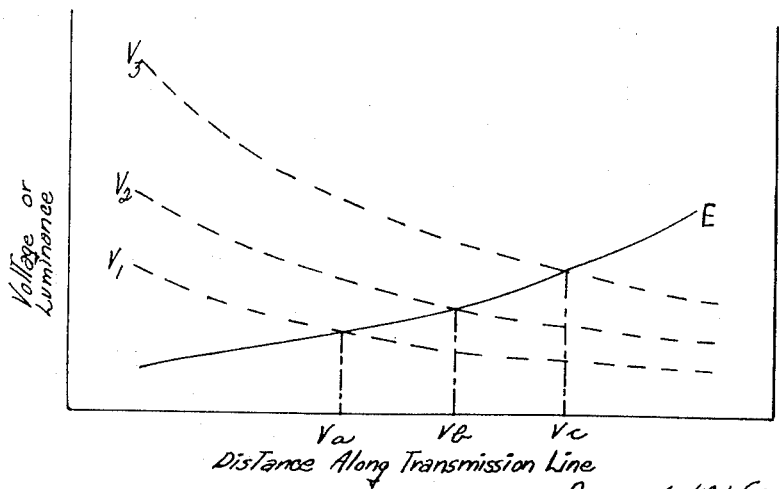
FIG. 6 is a graph illustrating the operation of the embodiment shown in FIGS. 4 and 5.

When either source is applied to its respective line, it causes the line to luminesce therealong with a maximum luminance at the input end diminishing in a uniform manner to a minimum at the other end, or possibly diminishing to non-luminance if the voltage-frequency characteristics of the applied signal are insufficient to induce luminescence along the entire line. In either event, the luminance against distance along transmission line graph of FIG. 6 shows a representative family of curves $V_1$, $V_2$, and $V_3$ for three different exemplary voltages that may be applied to line 50 for measurement on the meter. Curve E represents the luminance vs. distance along transmission line plot for the standard voltage when applied to line 50a. Since lines 50 and 50a extend in opposite directions, the slope of curve E is opposite to that of curves $V_1$, $V_2$ and $V_3$. It is apparent from the graph that for each of the voltages V there is a point along line 50 where the luminance is equal to that on the immediately adjacent point of line 50a, as denoted by the intersections $V_a$, $V_b$, and $V_c$ on the graph. And for different values of V this point of equal luminance is at a different location along the lines. Thus, by observing this point of equal luminance between the transmission lines, the voltage value from the unknown source 56 can be readily ascertained by the aid of suitable calibrations. As in the case of the preceding embodiments, the present meter may be used as a voltmeter to measure various voltage values obtained at 56 when the meter is suitably calibrated for the frequency of the signal applied. Also, in view of the preceding discussions, it is apparent that the meter can be calibrated to measure the frequency of the signal at 56 when the voltage thereof is maintained at a selected value.

Since the reading of this meter depends upon locating the point on the two transmission lines where the luminance intensity is equal, it is for practical accuracy purposes essential to provide some aid in locating this point. This may be facilitated by placing the two lines parallel to one another along their lengths and perpendicular to one another on their transverse axes, as shown in FIGS. 4 and 5, and by locating a semi-transparent mirror 62 at about a 45° angle intermediate the two transparent conductor surfaces 51, 51a. Whereupon, if the mirror 62 is viewed as indicated in FIG. 5, and if the switch 61 is rapidly alternated between the unknown source 56 and the standard source 60 at a rate of approximately five to fifteen times per second, there results a noticeable flicker all along the length thereof, except where the intensity of the luminance of the two lines is equal. By this means the point of equal luminance for the two lines can be determined with great accuracy, and the meter calibrations can be carried directly on the mirror 62 or transparent face of one of lines 50, 50a.

It can thus be seen that in accordance with the present invention there is provided an electrical meter which may be used and calibrated for measuring A.C. voltage and frequency. The principles and basic teachings of this invention may be practiced in various physical embodiments exemplified by the several embodiments specifically described herein. Various other embodiments and modifications of those presented herein will be apparent to those skilled in the art, and such embodiments and modifications as are embraced by the spirit and scope of the appended claims are contemplated as within the purview of the present invention.

I claim:

1. An electrical meter comprising a voltage attenuator, a plurality of electroluminescent cells coupled to said attenuator at separate points thereon representing different degrees of attenuation with said cells in electrical parallel relationship with at least a portion of said attenuator, said cells being in electrical parallel relationship to one another, and means for applying an A.C. input signal across said attenuator and the attenuated signal to said cells with said different degrees of attenuation, said attenuator including means for effecting a large degree of attenuation of said input signal voltage along said length thereof to render varying numbers of said cells luminescent along the length of said attenuator over a substantial range of input signal voltages, thereby providing a measure of the input signal voltage by the number of luminescent cells and said meter further including an A.C. voltage source for biasing said cells.

2. An electrical meter as defined in claim 1, wherein said attenuator is a resistance voltage divider network having a first resistance means occupying said electrical parallel relationship with said cells and to which said cells are coupled at said separate points, and additional plural resistance means each in individual electrical series relationship with a cell and each coupling one of said separate points across the remaining portion of said first resistance means.

3. An electrical meter comprising two electroluminescent cells, each having means for applying an electrical field thereto in response to an A.C. electrical input signal, each of said cells having a light transmissive section for transmitting the luminescence of the cell in response to said field, means cooperating with both said cells enabling a comparison of the luminescence developed by said two cells, and means for applying a reference A.C. input signal to one cell and a second A.C. input signal to the other cell, whereby the comparison of luminescence of said cells enables a determination of the voltage of said second signal.

4. An electrical meter as defined in claim 3, wherein said cells are elongate, said field applying means for each cell applies the field in diminishing strength along the cell, and said light transmissive section of each cell extends along the length of the cell.

5. An electrical meter as defined in claim 4, wherein said field applying means for each cell is an attenuating transmission line, said means enabling a comparison of luminance is a semi-transparent mirror, said two cells and mirror being relatively oriented so that the luminance of the two cells can be viewed simultaneously, one through the mirror and the other as a reflected image from the mirror, and further including means for alternately applying in repeated rapid sequence the reference signal to one cell and the second signal to the other cell.

6. An electrical meter as defined in claim 5, wherein said two cells are relatively oriented so that their respective transmission lines extend in opposite directions.

7. A device for displaying a characteristic of an electrical signal, comprising an elongate voltage attenuating means, a first electrical terminal means for said attenuating means and a second electrical terminal means for said attenuating means spaced from said first terminal means along a length of said attenuating means for receiving thereacross an A.C. input signal and thus providing a voltage drop along the length of said attenuating means between said terminal means, electroluminescent material distributed along a length of said attenuating means between said electrical terminal means, and a conductive means sandwiching said material between said attenuating means and said conductive means, said conductive means being electrically coupled with one of said terminal means, whereby the luminescent response of said material varies in accordance with the attenuation of an A.C. signal along the length of said attenuating means between said terminal means, said attenuating means including means for effecting a large degree of attenuation of said input voltage along said length thereof to provide varying lengths of luminescent response of said material along the length of said attenuating means over a substantial range of input signal voltages, thereby providing a measure of the input signal voltage by said length of luminescent response.

8. A device as set forth in claim 7, wherein said electroluminescent material comprises a plurality of separate units of said material each electrically coupled to separate points along said length of said attenuating means between said electrical terminal means, and said conductive means comprises a conductive element for each of said units, said conductive elements being all electrically coupled together.

9. A device as set forth in claim 7, wherein said attenuating means is a resistance means.

10. A device as set forth in claim 7, and further including an A.C. voltage source biasing said material.

11. A device as set forth in claim 7, wherein said voltage attenuating means is an attenuating transmission line.

12. A device as set forth in claim 11, wherein said attenuating transmission line is formed from first and second elongate high resistance superposed plates with a dielectric therebetween, and a characteristic impedance termination for said line.

13. A device for displaying a characteristic of an electrical signal, comprising an elongate voltage attenuating means, electroluminescent material distributed along the length of said attenuating means, conductive means sandwiching said material between it and said attenuating means to form an electroluminescent cell, means for applying an input voltage signal to one end of said attenuating means and to said conductive means across said material, means including a bias voltage source for relating to each other the effective values of the electrical series impedance of said attenuating means, the shunt impedance between said attenuating means and conductive means, and the voltage of the input signal so that the threshold voltage of the material is obtained across said cell at a point intermediate the two ends of said attenuating means, whereby the length of luminescence along said cell is a comparative measure and display of the voltage of said input signal.

References Cited in the file of this patent
UNITED STATES PATENTS

| | | |
|---|---|---|
| 2,755,457 | Diemer | July 17, 1956 |
| 2,818,531 | Peek | Dec. 31, 1957 |
| 2,851,634 | Kazan | Sept. 9, 1958 |